United States Patent [19]

Beegle

[11] 4,427,237

[45] Jan. 24, 1984

[54] DUAL WHEEL RIM SPACER BAND ASSEMBLY

[76] Inventor: William Beegle, 611 Fourth Ave. Lakemont, Altoona, Pa. 16602

[21] Appl. No.: 369,801

[22] Filed: Apr. 19, 1982

[51] Int. Cl.³ .............................................. B60B 11/02
[52] U.S. Cl. .............................. 301/13 SM; 301/36 R
[58] Field of Search .............. 301/13 SM, 13 R, 36 R, 301/36 WP, 38 R, 40 S, 128

[56] References Cited

U.S. PATENT DOCUMENTS 1,802,773  4/1931  Nelson ..................... 301/13 SM X
1,804,937  5/1931  Keller ....................... 301/13 SM X
4,351,568  9/1982  Ahlschwede ................... 301/405 X Primary Examiner—David A. Scherbel
Attorney, Agent, or Firm—Parmelee, Miller, Welsh & Kratz

[57] ABSTRACT

A dual wheel rim spacer band assembly for insertion between the inner and outer rims of a pair of rim mounted tires has a central annular member, and a pair of outer annular members adjustably interconnected therewith to permit the axial displacement of the outer members relative to the central member.

10 Claims, 3 Drawing Figures

DUAL WHEEL RIM SPACER BAND ASSEMBLY

BACKGROUND OF THE INVENTION

1. Field of the Invention

The invention is a spacer band assembly for use in mounting dual tires on a truck wheel. More specifically, the spacer band assembly positively maintains a predetermined clearance between the pair of rim mounted tires.

2. Description of the Prior Art

It is highly desirable to provide a mounting for dual rims which ensures that both rims are in an exact alignment with a plane perpendicular to the axis of rotation of the wheel. Exact alignment is particularly important when the vehicle is in motion and the rim mounted tires are subject to dynamic forces and stresses.

If either one or both of the rims are mounted on the wheel in such a manner as to lie in a plane which is not perpendicular to the rotational axis of the wheel, the tread on the tire will not travel along the roadway in a straight track with respect to the line of travel of the vehicle. This situation causes undue tread wear. More importantly, however, improper alignment can result in shock loading which induces excessive strains on the rim and wheel mounting assembly.

It has been known to use compressible and non-compressible spacer bands. For example, U.S. Pat. No. 3,623,773 shows an axially deformable spacer having a compressible medial portion containing compressible ribs and U.S. Pat. No. 3,623,772 shows an axially deformable spacer having side portions which are radially deflectable.

SUMMARY OF THE INVENTION

The present invention provides an expandable dual wheel spacer band assembly for insertion between a pair of rims of the type typically mounted on a spoked wheel. The spacer band assembly has two or more sections such that the effective axial width is adjustable prior to being locked to the desired width. The unit described here is a spacer band assembly that has a central annular member and a pair of outer annular members. The outer members are adjustably interconnected to the central member in order to effect the axial displacement of the outer annular members relative to the central annular member. The axial displacement of the two outer members is both simultaneous and uniform. Moreover, the degree of displacement is infinitely variable within the limit of axial travel provided each outer member.

BRIEF DESCRIPTION OF THE DRAWINGS

The above as well as other features and advantages of this invention will become apparent through consideration of the detailed description in connection with the accompanying drawings in which.

DESCRIPTION OF THE PREFERRED EMBODIMENT

Figure 1:
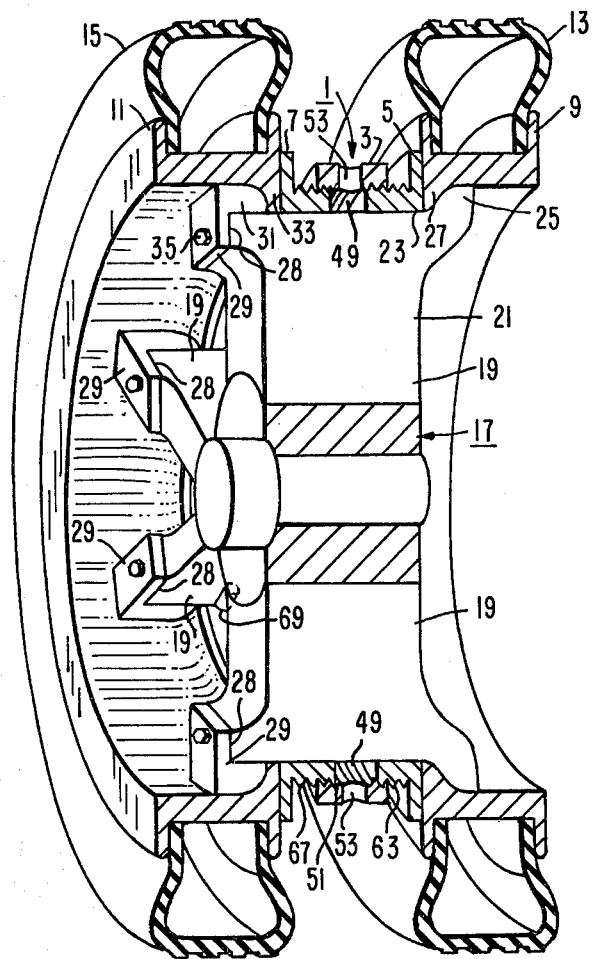
FIG. 1 is a cross-sectional view of a dual wheel assembly utilizing the spacer band assembly of this invention taken parallel to the axis of the wheel.
Figure 2:
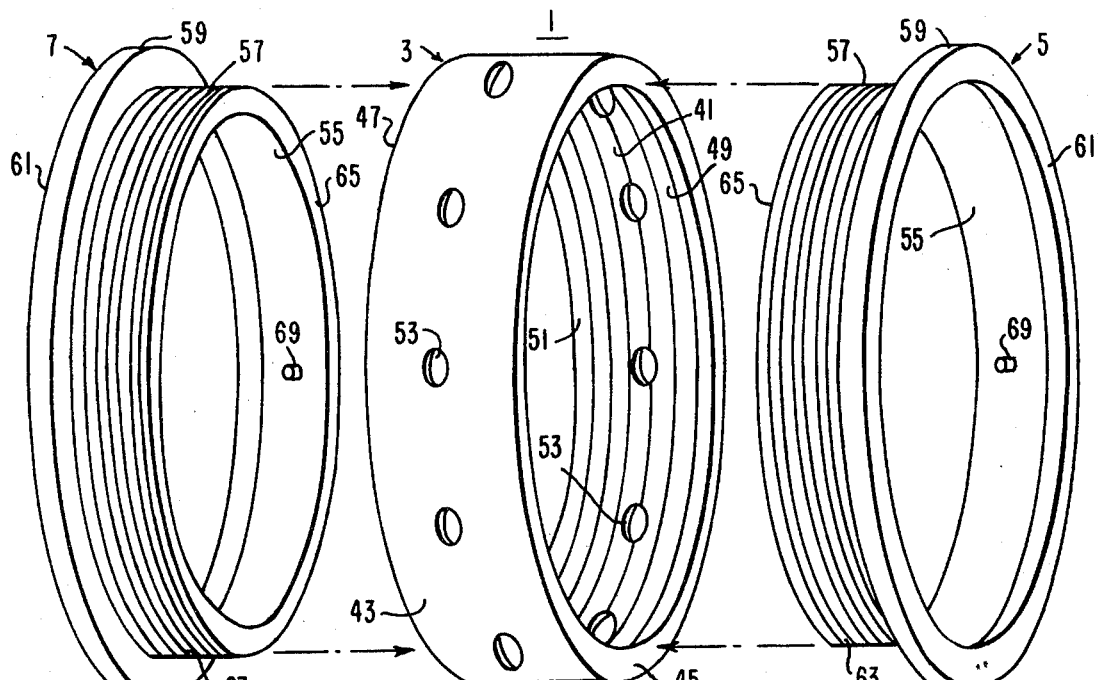
FIG. 2 is an exploded isometric view of the spacer band assembly of this invention.

Although the principals of this invention will be explained in connection with a specific embodiment thereof, it should be recognized that various modifications can be incorporated into this embodiment without departing from the spirit and scope of the invention. As shown in FIGS. 1 and 2, the dual-wheel rim spacer band assembly of this invention is generally indicated by the reference character 1. The spacer band assembly 1 consists of a central annular member 3 and a pair of outer annular members 5 and 7 adjustably connected to the central annular member 3 in a manner which will be hereinafter fully explained. The spacer band assembly 1 is positioned between the inner and outer rims 9 and 11 of two tires 13 and 15. The rims 9 and 11 and the spacer band assembly 1 are mounted on a wheel 17 which is bolted to the hub portion of an axle (not illustrated). Typically a wheel used for dual rim mounting has five or six equally spaced spokes 19 radiating from the center portion thereof. The free end 21 of each spoke 19 has a rim mounting surface generally indicated at 23. The mounting surfaces 23 of the spokes lie on a circle, the center of which coincides with the center of the wheel 17. A radially extending shoulder portion 25 of the mounting surface 23 is complementary to the inwardly depending flange 27 of the rim 9. A removable wedge 29 with a shoulder portion 31 which is complementary to the inwardly depending flange 33 of the rim 11 is secured to each spoke by a nut 35. The wedges 29 secure the rims 9 and 11 together with the spacer assembly 1 onto the free ends of the wheel's spokes 19.

The spacer assembly 1 provides a predetermined tire clearance and ensures that the rims 9 and 11 are parallel to a common plane which is perpendicular to the longitudinal axis of the axle onto which the wheel 17 is bolted. For purposes herein, the common plane referred to in this paragraph, is defined as the plane including all mounting surfaces 28 of the wheel spokes 19 controlling the inward axial travel limit of the wedges 29 as they are positioned by projections 31 and the threaded mounting studs 35.

Considering FIG. 2, the exploded view of the spacer band assembly 1 illustrates the preferred means for effecting the adjustable interconnection of the several members of the assembly. The central annular member 3 has an inner cylindrical surface 41, an outer cylindrical surface 43, a right edge 45 and a left edge 47. The inner cylindrical surface 41 has a continuous right-handed screw thread 49 beginning at the right edge 45 and terminating near the middle of the inner surface 41. A continuous left-handed screw thread 51 is also provided on the inner cylindrical surface 41, and begins at the left edge 47 and terminates near the middle of the inner surface 41. The central annular member 3 includes a plurality of apertures of bores 53 intermittently located in the middle of the outer cylindrical surface 43 about the circumference thereof. The purpose of the bores 53 will be hereinafter fully described.

The outer annular members of the assembly 1, or as they will now be described for the sake of clarity, right-hand member 5 and left-hand member 7, have an inner cylindrical surface 55 and an outer cylindrical surface 57 which is of a slightly smaller diameter then the inner cylindrical surface 41 of the central annular member 3. A continuous flange 59 may be provided along the outer most edge 61 of the outer cylindrical surface in order to increase the surface area of the spacer band assembly 1 contacting the rims 9 and 11. The outer cylindrical surface 57 of the right-hand member 5 has a continuous right-hand screw thread 63 extending from the inner edge 65 thereof toward the outer edge 61. This thread 63 is complementary to the right-hand screw thread 49 of the central annular member 3. The outer cylindrical surface 57 of the left-hand member 57 of the left-hand member 7 has a left-hand screw thread 67 extending from the inner edge 65 thereof toward the outer edge 61. The left-hand screw thread 67 is complementary to the left-hand screw thread 51 of the central member 3.

The combined right-hand screw threads 49 and 63 together with the left-hand screw threads 51 and 67 adjustably interconnect the three separate sections of the spacer band assembly 1. While various forms of thread may, of course, be employed with this invention, it is preferred that rounded thread (knuckle thread) be used because of its resistance to damage where clogging with dirt or corrosion is liable to occur. It should also be appreciated that the lead of the screw threads, that is, the axial distance which either outer annular member will advance in one revolution, can be varied to suit specific requirements. When the three members of the assembly are threadedly engaged, rotation of the central annular member 3 while preventing rotation of the outer members 5 and 7 will effect axial displacement of the aforesaid outer members relative to the central member 3. For example, when the assembly 1 is mounted on a wheel as illustrated in FIG. 1, so that the right-hand member 5 is adjacent the inner rim 9 of the dual-wheel assembly, rotation of the central member 3 in a counterclockwise direction effects the axial expansion of the spacer assembly 1. On the other hand, the clockwise rotation of the central member 3 effects the axial contraction of the assembly. The degree of axial displacement is virtually infinitely variable within the limits of travel defined by the right and left-handed threads. In order to inhibit rotational movement of the outer annular members 5 and 7 during the rotation of the central member 3, at least one protuberance 69 is provided on the inner cylindrical surface 55 of the members 5 and 7. Should one or both of the outer members 5 and 7 begin to rotate along with the central member 3, the protuberance 69 will limit the rotational movement of the outer member to a distance no greater than the gap between two adjacent spokes 19 of the wheel 17. The outer annular members 5 and 7 can also be designed to be of such a diameter that a friction fit is obtained between the inner cylindrical surface thereof and the mounting surface 23 of each spoke 19. Such a friction fit would also tend to inhibit any rotational travel of the outer members during the axial adjustment thereof. Typically conventional spacer bands are provided in sizes ranging from 15 inches to 24 inches in diameter and 3 inches to 4¾ inches in width. The present spacer band assembly 1 can readily be produced in the various diameters required in the industry, while the axial adjustment feature of this invention readily varies the width of the spacer band assembly to the width dictated by a particular application.

Figure 3:
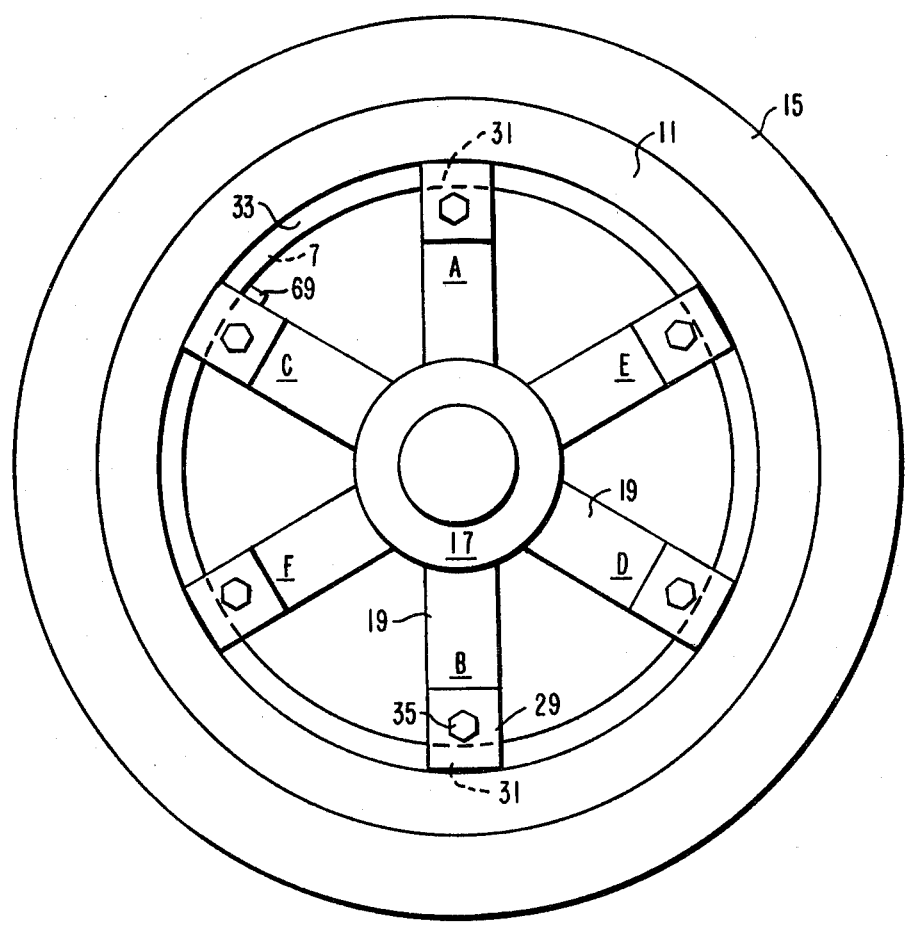
FIG. 3 is a side elevation of a dual wheel assembly.

Considering FIGS. 1 through 3, the installation and adjustment of the present spacer band assembly will be explained. All of the parts should be inspected for damage, dirt or rust. Defective parts should be repaired or replaced as necessary. The wheel 17 is properly mounted to the axle's hub with the wedges 29 and nuts 35 removed. The inner rim mounted tire 13 is axially aligned with the wheel 17 and placed onto the supporting surfaces 23 of the wheel's spokes 19 so that the flange 27 of the rim 9 abuts the shoulder 25 of each spoke. The three members of the spacer band assembly are adjustably interconnected so that the width thereof is at least slightly less than the standard spacer width required by the particular tires, rims and wheels being mounted. (While the rims illustrated herein are one piece rims, the present invention can, of course, be utilized with rims of multiple piece construction.) The spacer band assembly 1 is axially aligned with the wheel 17 and the entire assembly rotated as necessary to align the protuberances 69 with the open area between spokes. The assembly is placed over the spokes in an abutting relationship with the rim 9. The outer rim mounted tire 15 is axially aligned with the wheel and mounted onto the spokes 19 with the flange 33 abutting the spacer band assembly. The wedges 29 are installed on the spokes and the nuts 35 tightened down to zero torque. It should be appreciated that when the nuts 35 are tightened down to zero torque, the wedges should sit flush against the common plane formed by the surfaces 28 of the spokes 19. The nuts 35 are then backed off from the wedges one and one quarter turns. At this time, the spacer band assembly 1 should be axially expanded. With the nuts 35 properly backed off, the spacer band assembly is axially adjusted by the rotation of the center annular member 3. Such rotation effects the axial expansion of the outer members 5 and 7 relative to the central member 3. The rotation of the central annular member 3 is facilitated by the bores 53 which permit the use of a spanner wrench or other suitable tool when adjusting the assembly. Rotation of the central member 3 is continued until the application of reasonable force no longer expands the assembly. Because the spacer band assembly 1 is reversible in the sense that the right-hand member 5 may be either abutting the inner rim 9 or the outer rim 11, the direction of rotation of the central member 3 for the expantion of the assembly will be dictated by the location of the right hand member 5. Suitable indicia can be provided on the central annular member 3 to designate the proper rotational direction for axial expansion and contraction of the spacer band assembly 1. The final step in the mounting of rims is the securing of the wedges 29. The nuts 35 are drawn up one-quarter turn at a time in the sequence indicated in FIG. 3 by the reference characters A through F. It is important that the nuts be tightened only to the torque level recommended by the manufacturer of the wheel to avoid damage to the wheels and rims. The spacer band assembly 1 can be removed and reused just as any other standard spacer band.

What has been described is dual-wheel rim spacer band assembly which is axially adjustable and reusable. The assembly provides for the accurate alignment of a set of dual wheels and maintains the predetermined tire clearance thereof during vehicle operation. The alignment accuracy is expected to be within 0.015 of an inch.

What is claimed is:

1. A dual wheel rim spacer band assembly for insertion between the inner and outer rims of a pair of rim mounted tires comprising:
   a central annular member; a first outer annular member and a second outer annular member, each of said outer annular members being adjustably interconnected with said central annular member to effect the axial displacement thereof relative to said central annular member with said first and second outer annular members each bearing axially against one of said rims, whereby said inner and outer rims are maintained in a determinable spaced-apart and aligned relationship by said spacer band assembly.

2. The spacer band assembly of claim 1 wherein the central annular member and the outer annular members are threadedly interconnected so that rotation of said central annular member relative the said outer members effects the axial displacement of said outer members relative thereto.

3. The spacer band assembly of claim 2 wherein the threaded interconnection of the first outer member to the central annular member is a right-hand thread and the threaded interconnection of the second annular member to the central annular member is a left-handed thread whereby rotational movement of the central member relative to the outer members in a first direction effects the axial expansion of said assembly while rotational movement in a second, opposite direction effects the axial contraction of said assembly.

4. The spacer band assembly of claim 3 wherein the outer members have an inner edge adjacent the central annular member and an outer edge distal therefrom, said outer edge having a radially extending, circumferentially disposed flange which abuts the rim adjacent each said outer member.

5. The spacer band assembly of claims 3 or 4 wherein the central annular member has a plurality of bores therein, said bores being suitable for the application of a tool to effect rotational movement thereof.

6. The spacer band assembly of claim 5 wherein the inner and outer rims are mounted on a spoked wheel and wherein the outer members each have at least one protuberance projecting radially inward therefrom whereby said protuberance abuts one of the spokes of said spoked wheel and inhibits the rotational movement of said outer member relative to said spoked wheel.

7. A dual wheel rim spacer band assembly for insertion between the inner and outer rims of a pair of rim mounted tires comprising:

a central annular member; a first outer annular member threadedly interconnected with said central annular member by a right-hand thread and a second outer annular member threadedly interconnected with said central annular member by a left-hand thread to effect the displacement of said first and second outer members relative to said central annular member with said first and second outer annular members each bearing axially against one of said rims, whereby rotational movement of the central member relative to said outer members in a first direction effects the axial expansion of said spacer band assembly while rotational movement in a second, opposite direction effects the axial contraction of said assembly so that said inner and outer rims are maintained in a determinable spaced-apart and aligned relationship by said spacer band assembly.

8. The space band assembly of claim 7 wherein the outer members have an inner edge adjacent the central annular member and an outer edge distal therefrom, said outer edge having a radially extending, circumferentially disposed flange which abuts the rim adjacent each said outer member.

9. The spacer band assembly of claim 8 wherein the central annular member has a plurality of bores therein, said bores being suitable for the application of a tool to effect rotational movement thereof.

10. The spacer band assembly of claim 9 wherein the inner and outer rims are mounted on a spoked wheel and wherein the outer members each have at least one protuberance projecting radially inward therefrom whereby said protuberance abuts one of the spokes of said spoked wheel and inhibits the rotational movement of said outer member relative to said spoked wheel.

* * * * *